US 11,822,405 B2

(12) United States Patent
Cheng et al.

(10) Patent No.: US 11,822,405 B2
(45) Date of Patent: Nov. 21, 2023

(54) POWER ALLOCATING SYSTEM, ELECTRONIC DEVICE AND ADAPTER THEREOF

(71) Applicant: ASUSTeK COMPUTER INC., Taipei (TW)

(72) Inventors: Tzu-Nan Cheng, Taipei (TW); Yu-Cheng Shen, Taipei (TW)

(73) Assignee: ASUSTEK COMPUTER INC., Taipei (TW)

( * ) Notice: Subject to any disclaimer, the term of this patent is extended or adjusted under 35 U.S.C. 154(b) by 0 days.

(21) Appl. No.: 17/105,605

(22) Filed: Nov. 26, 2020

(65) Prior Publication Data

US 2021/0173459 A1    Jun. 10, 2021

(30) Foreign Application Priority Data

Dec. 4, 2019   (TW) .................................. 108144366

(51) Int. Cl.
*G06F 1/26*      (2006.01)
*G06F 1/28*      (2006.01)

(52) U.S. Cl.
CPC ................ *G06F 1/266* (2013.01); *G06F 1/28* (2013.01)

(58) Field of Classification Search
CPC ............. G06F 1/263; G06F 1/266; G06F 1/28
See application file for complete search history.

(56) References Cited

U.S. PATENT DOCUMENTS

| 7,269,751 | B2* | 9/2007 | Janakiraman | G06F 1/263 |
| | | | | 713/323 |
| 10,103,574 | B2 | 10/2018 | Siegler et al. | |
| 2011/0077878 | A1* | 3/2011 | Lathrop | H02J 13/0003 |
| | | | | 702/62 |
| 2014/0359331 | A1* | 12/2014 | Kuan | G06F 11/00 |
| | | | | 713/323 |
| 2015/0105925 | A1* | 4/2015 | Li | G06F 1/263 |
| | | | | 700/291 |
| 2015/0372538 | A1* | 12/2015 | Siegler | G06F 1/26 |
| | | | | 307/23 |
| 2016/0239079 | A1* | 8/2016 | Yuasa | G06F 1/263 |
| 2016/0282892 | A1* | 9/2016 | Saavedra | G05B 15/02 |
| 2018/0059754 | A1* | 3/2018 | Shaikh | G06F 1/28 |

FOREIGN PATENT DOCUMENTS

| CN | 105119330 A | 12/2015 |
| CN | 107453429 A | 12/2017 |
| CN | 107482612 A | 12/2017 |

* cited by examiner

*Primary Examiner* — Jaweed A Abbaszadeh
*Assistant Examiner* — Brian J Corcoran
(74) *Attorney, Agent, or Firm* — McClure, Qualey & Rodack, LLP

(57) ABSTRACT

The present disclosure provides a power allocating system, including adapters and an electronic device. Each of the adapters includes a processor. The electronic device includes a controller. The controller obtains rated information and current output information from each of the processors to calculate an output utilization rate of each of the adapters. The controller transmits at least one adjusting signal to at least one of the processors according to the output utilization rates to adjust the output utilization rate of the adapters.

5 Claims, 2 Drawing Sheets

POWER ALLOCATING SYSTEM, ELECTRONIC DEVICE AND ADAPTER THEREOF

CROSS-REFERENCE TO RELATED APPLICATION

This application claims the priority benefit of Taiwan applications serial No. 108144366, filed on Dec. 4, 2019. The entirety of the above-mentioned patent application is hereby incorporated by reference herein and made a part of specification.

BACKGROUND OF THE INVENTION

Field of the Invention

The invention relates to a power allocating system and an electronic device and an adapter.

Description of the Related Art

An adapter is used to supply power to an electronic device (such as a notebook computer). When more adapters are available, users are able to choose different adapters and/or different number of the adapters based on various usage conditions.

In order to achieve the above purpose, multiple adapters are provided in parallel to meet the electronic device's different power requirements. However, if the rated power of the adapters connected to the electronic device are different, the electronic device will mainly load the adapter with the highest output voltage, which results no substantial usage with other adapters, and may even cause the adapter with the highest output voltage overloaded. Therefore, if multiple adapters are provided at the same time, the adapters are still limited to use under the same power.

BRIEF SUMMARY OF THE INVENTION

According to the first aspect of the disclosure, a power allocating system is provided. The power allocating system includes adapters and an electronic device. Each of the adapters includes a processor. The electronic device includes a controller. The controller obtains rated information and current output information from each of the processors to calculate an output utilization rate of each of the adapters. The controller transmits at least one adjusting signal to at least one of the processors according to the output utilization rates to adjust the output utilization rate of the adapters.

According to the second aspect of the disclosure, an electronic device electrically connected to a plurality of adapters is provided. The electronic device includes a controller. The controller is configured to operate the following steps: calculating the output utilization rate of each of the adapters based on rated information and current output information obtained from each of the adapters; and outputting at least one adjusting signal to at least one of the adapters according to the output utilization rates.

According to the third aspect of the disclosure, an adapter adapted to an electronic device with a controller is provided. The adapter comprises a processor. The processor is configured to transmit rated information and current output information of the adapter to the controller of the electronic device, receive an adjusting signal from the controller of the electronic device, and adjust an output utilization rate of the adapter according to the adjusting signal.

These and other features, aspects and advantages of the present invention will become better understood with regard to the following description, appended claims, and accompanying drawings.

DETAILED DESCRIPTION OF THE EMBODIMENTS

The terms used here have their usual meanings. Further, terms such as those defined in commonly used dictionaries should be construed as having meaning in the context of this specification and the related technical field, and are expressly set forth herein. The use of any of the words discussed here in the specification is only an example, and is not intended to limit the scope and practice of the disclosure. Similarly, this disclosure is not limited to the various embodiments shown in this specification.

As used herein, "coupled" or "connected" refers to two or more elements making direct physical or electrical contact with each other, or indirectly physical or electrical contact with each other, or refers to the interoperation or movement of two or more components.

Figure 1:
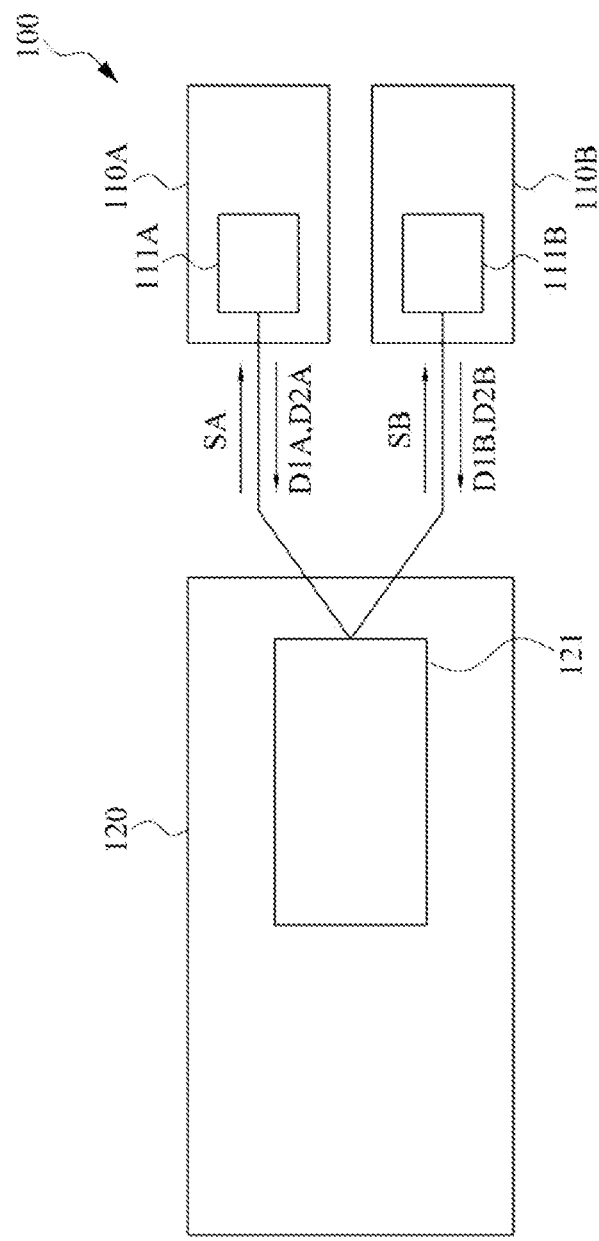
FIG. 1 is a block diagram of a power allocating system disclosed in some embodiments.

Please refer to FIG. 1. In some embodiments, a power allocating system 100 includes an adapter 110A, an adapter 110B, and an electronic device 120. The electronic device 120 is electrically connected to the adapters 110A, 110B. The adapter 110A includes a processor 111A, the adapter 110B includes a processor 111B, and the processor 111A and the processor 111B are respectively coupled to a controller 121 in the electronic device 120. In some embodiments, the electronic device 120 is a notebook computer, a tablet computer, a desktop host or an All-in-One computer. In some embodiments, the processor 111A or the processor 111B is a micro controller unit (MCU) or a power delivery (PD) chip, which is not limited herein. The power allocating system 100 includes any number of the adapters. To simplify the description, only two adapters are illustrated in FIG. 1, which is not limited herein.

The adapter 110A has a rated power, a rated voltage and a maximum current, which are fixed. In an embodiment, the rated information D1A is the maximum current of the adapter 110A, the current output information D2A is the output current in the current state and the current output voltage is calculated according to the power of the adapter 110A and the output current. Similarly, when the rated information D1A is voltage, the maximum current is calculated according to the power of the adapter 110A and the voltage. Therefore, the information types of the rated information D1A and the current output information D2A are voltage, current, or power, and those skilled in the art may select an appropriate information type according to actual needs.

In an embodiment, the adapter 110B has a rated power, a rated voltage and a maximum current, which are fixed. In an embodiment, the rated information D1B is the highest current of the adapter 110B, the current output information D2B is the output current in the current state, and the current output voltage is calculated according to the power of the adapter 110B and the output current. Similarly, when the rated information D1B is voltage, the maximum current is also calculated according to the power of the adapter 110B and the voltage. Therefore, the information types of the rated information D1B and the current output information D2B is voltage, current, or power, and those skilled in the art may select appropriate information types according to actual needs. In one embodiment, when the rated information D1A of the adapter 110A is 10 volts (V) and the rated power of the adapter 110A is 230 watts (W), the rated current is calculated to be 23 amperes (A).

In some embodiments, the processors 111A, 111B of each of the adapters 110A, 110B transmits the rated information and the current output information of each of the adapters to the controller 121. The controller calculates an output utilization rate of each the adapter based on the rated information and a current output information received from each of the adapters. In some embodiments, when the types of the current output information and the rated information of each of the adapters 111A and 111B are different, the current output information and the rated information need to be converted to the same type. In one embodiment, the rated information D1A of the adapter 110A is 20 volts (V) and the current output information D2A is 2 amperes (A) and the power is a fixed value, when it is known that the rated power of the adapter 110A is 200 watts (W), the rated current is calculated to be 10 amperes (A). Moreover, the current output information D2A is divided by the converted rated information D1A to calculate the output utilization rate to be 2 amps (A)/10 amps (A)=1/5. In other words, the output utilization rate of the adapter 110A is now 20%.

Similarly, in the case that the rated information D1B of the adapter 110B is 20 amperes (A), and the current output information D2B is 20 volts (V) and the power is a fixed value, when it is known that the rated power of the adapter 110B is 400 watts (W), the current output current is calculated to be 20 amps (A). Further, the converted current output information D2B is divided by the rated information D1B to calculate the output utilization rate to be 20 amps (A)/20 amps (A)=1. In other words, the output utilization rate of the adapter 110B is now 100%.

In this case, the controller 121 sends at least one adjusting signal (such as the adjusting signal SA or the adjusting signal SB) to at least one of the processor 111A of the adapter 110A or the processor 111B of the adapter 110B according to the output utilization rate of the adapter 110A is 20% and the output utilization rate of the adapter 110B is 100%, to adjust the output utilization rate of the adapters. In one embodiment, the adjusting signals received by the adapter 110A and the adapter 110B is configured to adjust the output utilization rate of the adapter 110A and that of the adapter 110B, respectively, to be substantially equal or exactly equal. In some embodiments, since the output utilization rate of the adapter 110B is greater than that of the adapter 110A, the output utilization rate of the adapter 110B is reduced. In one embodiment, the controller 121 of the electronic device 120 transmits an adjusted signal SB to the adapter 110B to decrease the current of the corresponding current output information D2B, or to increase the voltage of the corresponding current output information D2B to make the current decrease accordingly. In some embodiments, an adjusted signal SA is sent to the adapter 110A with smaller output utilization rate to increase the current corresponding to the current output information D2A, or to reduce the voltage of the corresponding current output information D2A to increase the current accordingly. In some embodiments, two adjusting signals SA and SB are transmitted at the same time, the adjusting signal SB with a decreasing command is sent to the adapter 110B, and the adjusting signal SA with an increasing command is sent to the adapter 110A, and the adapter 110B and the adapter 110A simultaneously receive the corresponding adjusting signals to simultaneously reduce the current of the current output information D2B (or increase its voltage) and increase the current of the current output information D2A (or reduce its voltage). The step is repeated until the output utilization rate of the adapter 110A and that of the adapter 110B are substantially equal or completely equal (for example: the output utilization rate of each adapter is 20%).

In some embodiments, the controller 121 calculates the target output information of the adapters 111A, 111B based on the demand information of the electronic device 120 and the rated information of the adapters 110A, 110B, and transmits the target output information to each of the adapters 111A, 111B, and then the current output information of each of the adapters 111A, 111B is adjusted through the processor of each of the adapters 111A, 111B respectively. In other words, the rated information of each adapter is a fixed value, and the current output information is adjusted according to the needs of the electronic device. In an embodiment, when the demand information (such as demand current) of the electronic device 120 is 12 amperes (A), the rated information D1A of the adapter 110A is 10 amperes (A), and the rated information D1B of the adapter 110B is 20 amps (A), the controller 121, calculates that the target output information of the adapter 110A is 12*1/(2+1)=4 amps (A), and the target output information of the adapter 110B is 12*2/(2+1)=8 amps (A) based on the relationship of the rated information ratio 10:20=1:2 of the adapters 110A and the adapter 110B. Then, the controller 121 transmits the adjusting signal SA to the processor 111A of the adapter 110A, to adjust the output utilization rate of the adapter 110A to 4/10=40%. The controller 121 also transmits the adjusting signal SB to the processor 111B of the adapter 110B, to adjust the output utilization rate of the adapter 110B to 8/20=40%. The sum of the target output information 4 amps (A) of the adapter 110A and the target output information 8 amps (A) of the adapter 110B is equal to the demand information 12 amps (A) of the electronic device 120. Next, the target output information 4 amperes (A) of the adapter 110A is used as the current output information of the adapter 110A and the target output information 8 amps (A) of the adapter 110B is used as the current output information of the adapter 110B.

More specifically, in one embodiment, each adjustment of the controller 121 is set to 0.2 volts (V), therefore, each time the controller 121 transmits the adjusting signal to each processor, the current output voltage of the adapter corresponding to each processor is increased or decreased by 0.2 volts (V). In one embodiment, assuming that the rated power of the adapter 110A (that is, the rated information) is 20 watts (W) and the current output information is 2 amperes (A), if the target output information is going to be adjusted to 2.1 amps (A), the relationship of that power=voltage*current is used to calculate the current output voltage to 10 volts (V) and the target output voltage to about 9.523 volts (V). At this time, the processor 111A successively decreases the current output voltage of the adapter 110A (for example: the voltage is 9.8 volts (V) and the current is about 2.04 amps (A) after the first adjustment, and so on). After two adjustments with 0.2 volts (V) each time, the original current output voltage of 10 volts (V) is adjusted to 10−2*0.2=9.6 volts (V), and the current is adjusted to 20 watts (W)/9.6 volts (V)=2.083 amps accordingly, which is close the target output information of the adapter 110A is 2.1 amps (A).

Similarly, in some embodiments, the current output information of the adapter 110B is adjusted down in the same way, and the current output information of the adapter 110B is adjusted to be equal to the target output information by the processor 111B. It should be noted that, as mentioned above, in some embodiments, the adjusting signals sent to different adapters are transmitted simultaneously or in any order. In some embodiments, each voltage change range is adjustable according to different needs, which is not limited herein. In some embodiments, when n adapters are used simultaneously, but the controller of the electronic device calculates that only n−1 the adapters need to be adjusted according to the above method, only n−1 adjusting signals are sent to the processors of n−1 adapters that need to adjust the current output information. In each subsequent adjustment process, when a part of the adapters' current output information value has been adjusted to the target output information, the controller of the electronic device no longer sends the adjusting signal to the adapter that has been adjusted to the target output information. Therefore, the number of the adjusting signals changes in different stages, the number of the adjusting signals is the same as or different to the number of the adapter, and the number of the adjusting signals is not a fixed value.

Figure 2:
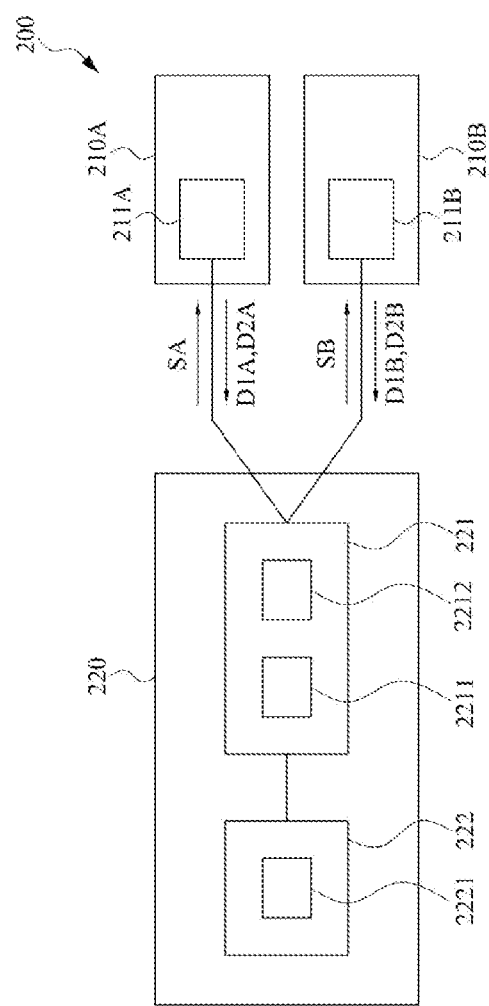
FIG. 2 is a block diagram of a power allocating system disclosed in some embodiments.

Please refer to FIG. 2. The difference between the power allocating system 200 in FIG. 2 and the power allocating system 100 in FIG. 1 is that the controller 221 further includes a calculating circuit 2211. In other embodiments, the controller 221 further includes a control circuit 2212. In an embodiment, the calculating circuit 2211 calculates the rated information and the current output information transmitted by the electronic device 220 from each of the adapters to adjust the current output information of each of the adapters, so that the output utilization rates of the adapters are substantially equal or completely equal. In an embodiment, when the controller 221 is different from the processor 211A of the adapter 210A or the processor 211B of the adapter 210B, it means that the data format that the controller 221 can process might also different from the data formats that the processor 211A and the processor 211B can process. Therefore, in one embodiment, the control circuit 2212 in the controller 221 converts the data format into a proper data format for the processor 211A, the processor 211B and the controller 221. In an embodiment, when the calculating circuit 2211 in the controller 221 is used to read or process the first format data, the control circuit 2212 converts the second format data from the adapter 210A or the adapter 210B into the first format data. In one embodiment, the processor 211A in the adapter 210A or the processor 211B in the adapter 210B for reading or processing the second format data converts the first format data from the controller 221 to the second format data before the processor 211A or the processor 211B reads or processes the second format data.

Please continue referring to FIG. 2. The difference between the power allocating system 200 in FIG. 2 and the power allocating system 100 in FIG. 1 is that the electronic device 220 in FIG. 2 includes a memory 222. The memory 222 is electrically connected to the controller 221, and the memory 222 stores at least one algorithm 2221 for executing commands in any one of the foregoing embodiments, so that the controller 221 of the electronic device 220 uses at least one algorithm 2221 to implement any of the foregoing embodiments.

Besides the above-mentioned components, the rest of the components in FIG. 2 that are similar to the component numbers of FIG. 1 have similar connection and operation methods (for example: the adapter 110A is similar to the adapter 210A, the electronic device 120 and the electronic device 220, and so on). For the concise purpose, components with similar connection and operation processes in FIG. 2 will not be repeated here.

In summary, the adapter and the power allocating system and method formed by using the adapter provided by the disclosure, allow the electronic device to choose and use the corresponding number of the adapters with different powers in different demand states, and further to make the use of the adapter is more flexible.

Although the present invention has been described in considerable detail with reference to certain preferred embodiments thereof, the disclosure is not for limiting the scope. Persons having ordinary skill in the art may make various modifications and changes without departing from the scope. Therefore, the scope of the appended claims should not be limited to the description of the preferred embodiments described above.

What is claimed is:
1. A power allocating system, comprising:
a plurality of power adapters, each of the power adapters includes a processor, wherein the power adapters comprises a first power adapter and a second power adapter; and
an electronic device, comprising:
a power controller, electrically connected with the processors of the power adapters, wherein the power controller obtains rated information and current output information from each of the processors to calculate an output utilization rate of each of the power adapters, and the power controller transmits at least one adjusting signal to at least one of the processors according to the output utilization rates to adjust the output utilization rate of the power adapters;
wherein the power controller is configured to calculate target output information of each of the power adapters by setting a ratio of first target output information of the first power adapter to second target output information of the second power adapter to be equal to a ratio of the rated information of the first power adapter to the rated information of the second power adapter, and by setting a sum of the first target output information and the second target output information to be equal to demand information of the electronic device, and the current output information of at least one of the power adapters is adjusted by the processors based on the target output information;
wherein each of the rated information is a maximum current of each of the power adapters, and the demand information is a demand current of the electronic device;
wherein the power controller transmits at least one adjusting signal to at least one of the processors according to the output utilization rates to adjust the output utilization rate of the power adapters to be equal, and each of the adjusted power adapters corresponds to different rated information;
wherein the power adapters include the first power adapter with a first output utilization rate and the second power adapter with a second output utilization rate, wherein when the first output utilization rate is greater than the second output utilization rate, at least one of the processors decreases the first output utilization rate and at least one of the processors increases the second output utilization rate from a non-zero output utilization rate.

2. An electronic device, adapted for electrically connecting to a plurality of power adapters, the electronic device includes a power controller, and the power controller is configured to operate the following steps:
  calculating an output utilization rate of each of the power adapters based on rated information and current output information obtained from each of the power adapters, wherein the power adapters comprises a first power adapter and a second power adapter; and
  outputting at least one adjusting signal to at least one of the power adapters according to the output utilization rates;
  wherein the power controller is configured to calculate target output information of each of the power adapters by setting a ratio of first target output information of the first power adapter to second target output information of the second power adapter to be equal to a ratio of the rated information of the first power adapter to the rated information of the second power adapter, and by setting a sum of the first target output information and the second target output information to be equal to demand information of the electronic device, and the current output information of at least one of the power adapters is adjusted by a plurality of processors based on the target output information;
  wherein each of the rated information is a maximum current of each of the power adapters, and the demand information is a demand current of the electronic device;
  wherein the power controller outputs at least one adjusting signal to at least one of the power adapters according to the output utilization rates to adjust the output utilization rates of the power adapters to be equal, and each of the adjusted power adapters corresponds to different rated information;
  wherein the power adapters include the first power adapter with a first output utilization rate and the second power adapter with a second output utilization rate, the power controller outputs the adjusting signal to the first power adapter to decrease the first output utilization rate and outputs the adjusting signal to the second power adapter to increase the second output utilization rate from a non-zero output utilization rate when the first output utilization rate is greater than the second output utilization rate.

3. The electronic device according to claim 2, wherein the power controller includes a control circuit and a calculating circuit, wherein the calculating circuit is configured to process a first format data, and the control circuit is configured to convert a second format data received from the power adapters into the first format data and provide the first format data to the calculating circuit.

4. A power adapter, adapted to an electronic device with a power controller, wherein the power adapter comprising:
  a processor, configured to transmit rated information and current output information of the power adapter to the power controller of the electronic device, to receive an adjusting signal from the power controller of the electronic device, and to adjust an output utilization rate of the power adapter according to the adjusting signal;
  wherein the power controller is electrically connected with the processor of the power adapter and a second processors of a second power adapter, the power controller of the electronic device is configured to calculate target output information of the power adapter and the second power adapters by setting a ratio of first target output information of the power adapter to second target output information of the second power adapter to be equal to a ratio of the rated information of the power adapter to rated information of the second power adapter, and by setting a sum of the first target output information and the second target output information to be equal to demand information of the electronic device, and the current output information of at least one of the power adapter and the second power adapters is adjusted by the processor and the second processors based on the target output information;
  wherein each of the rated information is a maximum current of the power adapter and the second power adapters, and the demand information is a demand current of the electronic device;
  wherein the power controller transmits the adjusting signal to the processor and transmits at least one second adjusting signal to the second processor according to the output utilization rates of the power adapter and the second processor to adjust the output utilization rates of the power adapter and the second processor to be equal, and each of the adjusted power adapters corresponds to different rated information;
  wherein the power adapter has a first output utilization rate and the second power adapter has a second output utilization rate, wherein when the first output utilization rate is greater than the second output utilization rate, the power controller outputs the adjusting signal to the power adapter to decrease the first output utilization rate and outputs the adjusting signal to the second power adapter to increase the second output utilization rate from a non-zero output utilization rate.

5. The power adapter according to claim 4, wherein the processor is configured to receive the target output information from the electronic device, and to adjust the current output information of the power adapter according to the target output information, and the target output information is calculated by the power controller according to the demand information of the electronic device.

* * * * *